United States Patent
Ning et al.

(10) Patent No.: US 11,894,531 B2
(45) Date of Patent: Feb. 6, 2024

(54) METHOD FOR RECOVERING LITHIUM BATTERY SLURRY AND DEVICE FOR RECOVERY OF SAME

(71) Applicants: Guangdong Brunp Recycling Technology Co., Ltd., Guangdong (CN); Hunan Brunp Recycling Technology Co., Ltd., Hunan (CN); Hunan Brunp EV Recycling Co., Ltd., Hunan (CN)

(72) Inventors: Peichao Ning, Guangdong (CN); Changdong Li, Guangdong (CN); You Zhou, Guangdong (CN); Qiang Li, Guangdong (CN); Dingshan Ruan, Guangdong (CN); Song Chen, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp EV Recycling Co., Ltd., Hunan (CN)

( * ) Notice: Subject to any disclaimer, the term of this patent is extended or adjusted under 35 U.S.C. 154(b) by 0 days.

(21) Appl. No.: 18/270,471

(22) PCT Filed: Jun. 6, 2022

(86) PCT No.: PCT/CN2022/097187
§ 371 (c)(1),
(2) Date: Jun. 29, 2023

(87) PCT Pub. No.: WO2023/284440
PCT Pub. Date: Jan. 19, 2023

(65) Prior Publication Data
US 2023/0395888 A1   Dec. 7, 2023

(30) Foreign Application Priority Data

Jul. 15, 2021  (CN) .......................... 202110799471.3

(51) Int. Cl.
*H01M 10/54* (2006.01)
*C22B 7/00* (2006.01)

(52) U.S. Cl.
CPC ............. *H01M 10/54* (2013.01); *C22B 7/005* (2013.01)

(58) Field of Classification Search
CPC .............................. H01M 10/54; C22B 7/005
See application file for complete search history.

(56) References Cited

U.S. PATENT DOCUMENTS

2013/0323142 A1* 12/2013 Shimano ............. H01M 4/0471
423/49

FOREIGN PATENT DOCUMENTS

| CN | 103151525 A | 6/2013 |
| CN | 105727579 A | 7/2016 |

(Continued)

OTHER PUBLICATIONS

EPO machine generated English translation of CN-109626350-A (Year: 2019).*

(Continued)

*Primary Examiner* — Christopher P Domone
*Assistant Examiner* — Kimberly Wyluda
(74) *Attorney, Agent, or Firm* — McCarter & English, LLP

(57) ABSTRACT

A method for recovering lithium battery slurry, the method comprising: pretreating lithium battery slurry, and then subjecting the pretreated lithium battery slurry to centrifugal spray drying to separate a solid phase and a solvent. A device for the recovery of lithium battery slurry is a centrifugal (Continued)

spray drying system, and comprises a spray chamber (100), a cyclone separator (200), a condenser (400), a condensate storage tank (500), and a rectification tower (600); the system improves upon original centrifugal spray drying devices, and is designed to combine the processes of centrifugal spray drying and NMP condensation recovery, such that NMP can be directly recovered after separation of positive electrode material and the NMP.

4 Claims, 2 Drawing Sheets

(56) References Cited

FOREIGN PATENT DOCUMENTS

| CN | 106390495 | A |   | 2/2017  |            |
|----|-----------|---|---|---------|------------|
| CN | 107994286 | A |   | 5/2018  |            |
| CN | 109626350 | A | * | 4/2019  | C01B 25/375 |
| CN | 111180820 | A | * | 5/2020  | C01B 11/18 |
| CN | 211169856 | U |   | 8/2020  |            |
| CN | 111740079 | A |   | 10/2020 |            |
| CN | 111977704 | A |   | 11/2020 |            |
| CN | 113648670 | A |   | 11/2021 |            |

OTHER PUBLICATIONS

EPO machine generated English translation of CN-111180820-A (Year: 2020).*

International Search Report issued by the China National Intellectual Property Administration, acting as the ISA, for corresponding international application PCT/CN2022/097187, dated Sep. 1, 2022, with English translation.

Notification to Grant a Patent issued by the China National Intellectual Property Administration for corresponding Chinese application 202110799471.3 dated Jan. 4, 2023, with English translation.

* cited by examiner

METHOD FOR RECOVERING LITHIUM BATTERY SLURRY AND DEVICE FOR RECOVERY OF SAME

CROSS-REFERENCE TO RELATED APPLICATIONS

This application is the National Stage entry under 35 U.S.C. § 371 of International Application Number PCT/CN2022/097187 filed on Jun. 6, 2022, which claims the benefit of priority under 35 U.S.C. § 119 of Chinese patent application number 202110799471.3 filed Jul. 15, 2021.

TECHNICAL FIELD

The present invention belongs to the technical field of battery material recycling, and specifically relates to a recovery method for a waste lithium battery slurry containing NMP and a device for recover of the same.

BACKGROUND

The lithium battery production process can be divided into three stages, i.e., a electrode plate production stage, a cell production stage, and a battery assembling stage. In the first stage, to form an electrode plate, cathode material needs to be bonded onto an aluminum foil by PVDF as a binder. PVDF which is solid powder needs to be dissolved in NMP and mixed with the cathode material to form a stable suspension. In preparing and coating the slurry, variations in factors such as environment, foreign matters, and viscosity may lead to failure of slurry, i.e., the slurry cannot be coated normally. The slurry contains a large amount of valuable metals such as Li, Ni, Co, Mn, and contains about 20 wt % of N-methylpyrrolidone (NMP), which are worth recovering from an economic point of view. In recent years, the prices of metal raw materials and NMP have been rising year by year, so it is particularly important to recover the slurry for cost control on lithium battery raw materials. Agglomerations often exist in the waste lithium battery slurry, and in the process of producing the electrode plates, some foreign matters such as plastic bags, steel nails, thread gloves, disposable gloves, and rags may be incorporated into the slurry in wiping and repairing the coating machine and related machines. Such foreign matters are usually concealed in the agglomerated slurry, and thus are difficult to be removed manually, affecting slurry delivery by a siphon pump. As a result, slurry filling must be carried out manually, which will greatly increase the cost of treatment, and also pollute the environment. From an environmental point of view, discarding the waste lithium battery slurry will seriously harm the environment. Therefore, NMP slurry recovering not only realizes a closed loop of the lithium battery industry but also protects the environment.

At present, the core technology of NMP slurry recovering is the solid-liquid separation of the slurry, the methods of which are mainly centrifugal separation, flocculation filter press separation, and the like. The related art discloses a method for recovering waste lithium battery cathode slurry in which a centrifuge is used to realize the solid-liquid separation. However, this method has low efficiency, small processing capacity, and poor centrifugal effect, and thus is not conducive to industrial application. The related art also discloses a method for treating waste lithium battery cathode liquid and applications thereof. In this method, the waste cathode liquid is injected into a treatment tank followed by adding with a flocculant. After stirring and leaving to stand, the supernatant liquid is directly subjected to sewage treatment, and the precipitates are uniformly mixed with diatomite. Finally the formed diatomite slurry is filter-pressed to obtain filtrate and filter residue. However, the flocculation and the filter-pressing are complicated and easy to introduce impurities.

SUMMARY

The present invention aims to solve at least one of the above-mentioned technical problems existing in the prior art. Accordingly, the present invention provides a recovery method for a lithium battery slurry and a device for recover of the same, which can improve the efficiency for treating waste lithium battery slurry.

According to one aspect of the present invention, a recovery method for a lithium battery slurry is provided, the recovery method comprising:
  performing a pretreatment on a lithium battery slurry; and
  performing a centrifugal spray-drying on a pretreated lithium battery slurry to separate a solid phase from a solvent.

In some embodiments of the present invention, the pretreatment comprises ball milling.

In some embodiments of the present invention, the ball milling is performed in a ball-to-material ratio of (5-50):1 at a rotation speed of 300 r/min to 1000 r/min. Further, the ball milling is performed in following conditions: a grinding concentration is 60% to 80%, a ball milling time is 10 min to 30 min, and a filling rate is 30% to 45%.

In some embodiments of the present invention, before the ball milling, the recovery method further comprises a step of crushing the slurry. Using the process of crushing followed by the ball milling, the difficulty in treating the slurry agglomerations can be overcome.

In some embodiments of the present invention, the crushing is performed by using a double-shaft crusher, and working parameters of the double-shaft crusher are as follows: a blade distance is 10 mm to 50 mm, and a rotation speed is 100 r/min to 500 r/min.

In some embodiments of the present invention, after the ball milling, the recovery method further comprises a step of sieving; and the sieving is performed with a 100- to 300-mesh sieve. Foreign matters such as plastic bags, steel nails, thread gloves, disposable gloves, and rags can be removed by the sieving.

In some embodiments of the present invention, the recovery method further comprises adjusting a pH value of the pretreated lithium battery slurry before the centrifugal spray-drying on the condition that the solvent of the lithium battery slurry comprises NMP.

In some embodiments of the present invention, the pH value is adjusted to a range of 7.0 to 8.0. Further, a pH-adjusting agent used in adjusting the pH value is 0.1 mol/L to 0.5 mol/L of sulfuric acid. The pH value adjustment can prevent the hydrolysis of NMP. Before the pH value adjustment, the pH value of the slurry is about 12.5. In such an alkaline environment, the three C atoms adjacent to the N atom in the NMP molecule may be activated. The activated C atom in C=O can directly cause NMP ring-opening hydrolysis to generate N-methyl-4-aminobutyric acid, and the activated C atoms in the methylene group and the methyl group adjacent to the N atom can undergo an oxidation reaction to generate peroxides, which are unstable and easy to generate hydroxyl groups, i.e., to generate 5-HNMP and NHMP. Also in such an alkaline environment, 5-HNMP and NHMP are easy to undergo ring-opening hydrolysis to generate N-methyl-4-hydroxyaminobutyric acid and N-hydroxymethyl-4-aminobutyric acid. At last, the three NMP hydrolysates can undergo polymerization reactions to form amide or ester polymers.

In some embodiments of the present invention, the centrifugal spray-drying is performed at a temperature of 150° C. to 300° C.; preferably, with a feeding rate of 800 L/h to 1500 L/h; and preferably, at a centrifugal speed of 8000 r/min to 25000 r/min.

In some embodiments of the present invention, the recovery method further comprises: condensing and purifying a gas phase generated by the centrifugal spray-drying. Further, the purifying is rectification.

In some embodiments of the present invention, the recovery method further comprises: calcining the solid phase. The solid phase is cathode material powder. The cathode material powder can be used as a raw material for leaching after the calcination. Organic substances inside the solid phase can be removed by the calcination.

In some embodiments of the present invention, the calcination is performed at a temperature of 600° C. to 1000° C. for 1 hour to 2 hours.

In some preferred embodiments of the present invention, the recovery method is performed in the following steps:
  S1: roughly crushing a waste lithium battery slurry containing NMP, and then ball milling to obtain a ball milled slurry;
  S2: sieving the ball milled slurry, and adjusting a pH value of the slurry passed through the sieve;
  S3: centrifugal spray-drying the pH-adjusted slurry to obtain a solid powder, and condensing and purifying the gas-phase NMP.

The present invention also provides a centrifugal spray-drying system for the recovery method, comprising a spray chamber, a swirl-flow separator, a condenser, a condensate storage tank, and a rectification tower. The spray chamber is provided with a centrifugal nozzle located at an upper part of the spray chamber and provided with a hot air inlet and a hot air outlet respectively located at both sides of the spray chamber. The hot air outlet is connected to an inlet of the swirl-flow separator. The swirl-flow separator, the condenser, the condensate storage tank, and the rectification tower are connected in sequence. During the operation of the system, the slurry is centrifuged at a high speed through the centrifugal nozzle. NMP and water in the slurry are quickly or instantaneously evaporated under the action of hot air with variable temperature. The solid phase and the gas phase enter the swirl-flow separator for separation. The gas phase is condensed through the condenser to form the NMP condensate, which is temporarily stored in the condensate storage tank. The condensate is purified by the rectification tower to form a pure NMP organic phase and a water phase.

In some embodiments of the present invention, a bag filter is connected between the swirl-flow separator and the condenser. Powder with a smaller density will enter the bag filter and be absorbed by the bag filter.

A preferred embodiment of the present invention at least has beneficial effects as follows:
  1. Aiming the problems such as low centrifugal efficiency, complicated flocculation filter press process, introduction of impurities in the conventional mainstream process, such as the centrifugal-calcination and flocculation sedimentation processes, the present invention adopts the centrifugal spray process to effectively solve these problems. By centrifugal spray, the cathode material can be completely and efficiently separated from NMP, the processing capacity can be increased, continuous feeding and discharging can be realized, and the processing scale can be expanded. No impurity elements will be introduced in the process, resulting in improved purity of NMP, simplified operation, reduced processing cost, and reduced environmental pollution, which can create huge economic benefits and build great industrial application prospects.
  2. The centrifugal spray-drying system in the present invention is improved from the conventional centrifugal spray-drying device, and designed in combination with the process of centrifugal spray-drying and NMP condensation recovering, so that NMP can be directly recovered after the cathode material is separated from the NMP, the processing efficiency is high, and continuous production can be realized.

BRIEF DESCRIPTION OF THE DRAWINGS

The present invention will be further described below in conjunction with the drawings and embodiments.

Figure 1:
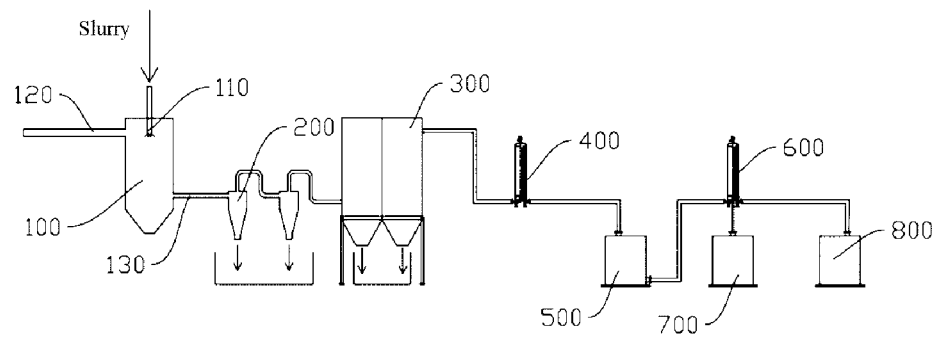
FIG. 1 is a schematic view of an overall structure of a centrifugal spray-drying system in Example 1 of the present invention.

Reference numerals: spray chamber 100, centrifugal nozzle 110, hot air inlet 120, hot air outlet 130, swirl-flow separator 200, bag filter 300, condenser 400, condensate storage tank 500, rectification tower 600, water phase collector 700, NMP collector 800.

DETAILED DESCRIPTION OF THE EMBODIMENTS

The technical solutions and effects thereof will be clearly and fully described in the embodiments of the present invention in order to make the objects, technical features, and advantages of the present application more clear. Apparently, the described embodiments are merely a part rather than all of the embodiments of the present invention. Based on the embodiments of the present invention, other embodiments obtained by a person of ordinary skill in the art based on the embodiments of the present invention without creative efforts shall fall within the protection scope of the present invention.

Example 1

A centrifugal spray-drying system consists of a spray chamber 100, two swirl-flow separators 200, a bag filter 300, a condenser 400, a condensate storage tank 500, a rectification tower 600, a water phase collector 700, and an NMP collector 800. The spray chamber 100 is provided with a centrifugal nozzle 110 located at an upper part of the spray chamber 100, and provided with a hot air inlet 120 and a hot air outlet 130 respectively located at both sides of the spray chamber 100. The hot air outlet 130 is connected to an inlet of one swirl-flow separator 200. The swirl-flow separators 200, the bag filter 300, the condenser 400, the condensate storage tank 500, and the rectification tower 600 are connected in sequence.

A recovery method for a waste lithium battery slurry containing NMP, which comprises the following steps:

S1: 1000 L of NMP waste slurry was taken for roughly crushing by using a double-shaft crusher with a blade distance of 50 mm at a rotation speed of 100 r/min, and then the NMP waste slurry was subjected to ball milling in a ball miller for 15 minutes in following conditions: a rotation speed of 300 r/min, a ball-to-material ratio of 15:1, a grinding concentration of 60% and a filling rate of 30%;

S2: a slurry after the ball milling was sieved through a 100-mesh sieve to remove foreign substances, and a pH value of the slurry was adjusted to about 7.0 with 0.3 mol/L dilute sulfuric acid; and S3: a pH-adjusted slurry was pumped into the centrifugal spray drying system, the system parameters was controlled as follows: a temperature of the hot air inlet was 150° C., a feeding speed was 800 L/h, a centrifugal speed was 8000 r/min, a temperature of the hot air outlet was 150° C.; the slurry was centrifuged at a high speed through the centrifugal nozzle; NMP and water in the slurry were quickly or instantaneously evaporated under the action of the hot air; a solid phase and a gas phase both entered the two swirl-flow separators for separation, and a powder material with relatively small density in the solid phase entered the bag filter and was absorbed by the bag filter; the gas phase was condensed by the condenser to obtain a NMP condensate which was temporarily stored in the condensate storage tank, and the condensate was purified by the rectification tower to obtain a pure NMP organic phase and a water phase; the obtained solid dried material was calcined at 1000° C. for 1 hour in an air atmosphere to remove the organic substances inside the material, so that a calcined material can be used as a raw material for a wet process.

Example 2

A centrifugal spray-drying system consists of a spray chamber 100, two swirl-flow separators 200, a bag filter 300, a condenser 400, a condensate storage tank 500, a rectification tower 600, a water phase collector 700, and an NMP collector 800. The spray chamber 100 is provided with a centrifugal nozzle 110 located at an upper part of the spray chamber 100, and provided with a hot air inlet 120 and a hot air outlet 130 respectively located at both sides of the spray chamber 100. The hot air outlet 130 is connected to an inlet of one swirl-flow separator 200. The swirl-flow separators 200, the bag filter 300, the condenser 400, the condensate storage tank 500, and the rectification tower 600 are connected in sequence.

A recovery method for a waste lithium battery slurry containing NMP, which comprises the following steps:

S1: 1000 L of NMP waste slurry was taken for roughly crushing by using a double-shaft crusher with a blade distance of 10 mm at a rotation speed of 500 r/min, and then the NMP waste slurry was subjected to ball milling in a ball miller for 20 minutes in following conditions: a rotation speed of 700 r/min, a ball-to-material ratio of 5:1, a grinding concentration of 70%, and a filling rate of 45%;

S2: a slurry after the ball milling was sieved through a 200-mesh sieve to remove foreign substances, and a pH value of the slurry was adjusted to about 7.1 with 0.2 mol/L dilute sulfuric acid; and S3: a pH-adjusted slurry was pumped into the centrifugal spray drying system, the system parameters was controlled as follows: a temperature of the hot air inlet was 200° C., a feeding speed was 1000 L/h, a centrifugal speed was 15000 r/min, a temperature of the hot air outlet was 100° C.; the slurry was centrifuged at a high speed through the centrifugal nozzle; NMP and water in the slurry were quickly or instantaneously evaporated under the action of the hot air; a solid phase and a gas phase both entered the two swirl-flow separators for separation, and a powder material with relatively small density in the solid phase entered the bag filter and was absorbed by the bag filter; the gas phase was condensed by the condenser to obtain a NMP condensate which was temporarily stored in the condensate storage tank, and the condensate was purified by the rectification tower to obtain a pure NMP organic phase and a water phase; the obtained solid dried material was calcined at 700° C. for 1.5 hour in an air atmosphere to remove the organic substances inside the material, so that a calcined material can be used as a raw material for a wet process.

Example 3

A centrifugal spray-drying system consists of a spray chamber 100, two swirl-flow separators 200, a bag filter 300, a condenser 400, a condensate storage tank 500, a rectification tower 600, a water phase collector 700, and an NMP collector 800. The spray chamber 100 is provided with a centrifugal nozzle 110 located at an upper part of the spray chamber 100, and provided with a hot air inlet 120 and a hot air outlet 130 respectively located at both sides of the spray chamber 100. The hot air outlet 130 is connected to an inlet of one swirl-flow separator 200. The swirl-flow separators 200, the bag filter 300, the condenser 400, the condensate storage tank 500, and the rectification tower 600 are connected in sequence.

A recovery method for a waste lithium battery slurry containing NMP, which comprises the following steps:

S1: 1000 L of NMP waste slurry was taken for roughly crushing by using a double-shaft crusher with a blade distance of 30 mm at a rotation speed of 300 r/min, and then the NMP waste slurry was subjected to ball milling in a ball miller for 30 minutes in following conditions: a rotation speed of 1000 r/min, a ball-to-material ratio of 50:1, a grinding concentration of 80%, and a filling rate of 35%;

S2: a slurry after the ball milling was sieved through a 300-mesh sieve to remove foreign substances, and a pH value of the slurry was adjusted to about 7.5 with 0.1 mol/L dilute sulfuric acid; and S3: a pH-adjusted slurry was pumped into the centrifugal spray drying system, the system parameters was controlled as follows: a temperature of the hot air inlet was 300° C., a feeding speed was 1500 L/h, a centrifugal speed was 18000 r/min, a temperature of the hot air outlet was 150° C.; the slurry was centrifuged at a high speed through the centrifugal nozzle; NMP and water in the slurry were quickly or instantaneously evaporated under the action of the hot air; a solid phase and a gas phase both entered the two swirl-flow separators for separation, and a powder material with relatively small density in the solid phase entered the bag filter and was absorbed by the bag filter; the gas phase was condensed by the condenser to obtain a NMP condensate which was temporarily stored in the condensate storage tank, and the condensate was purified by the rectification tower to obtain a pure NMP organic phase and a water phase; the obtained solid dried material was calcined at 600° C. for 2 hours in an air atmosphere to remove the organic substances inside the material, so that a calcined material can be used as a raw material for a wet process.

Example 4

A centrifugal spray-drying system consists of a spray chamber 100, two swirl-flow separators 200, a bag filter 300, a condenser 400, a condensate storage tank 500, a rectification tower 600, a water phase collector 700, and an NMP collector 800. The spray chamber 100 is provided with a centrifugal nozzle 110 located at an upper part of the spray chamber 100, and provided with a hot air inlet 120 and a hot air outlet 130 respectively located at both sides of the spray chamber 100. The hot air outlet 130 is connected to an inlet of one swirl-flow separator 200. The swirl-flow separators 200, the bag filter 300, the condenser 400, the condensate storage tank 500, and the rectification tower 600 are connected in sequence.

A recovery method for a waste lithium battery slurry containing NMP, which comprises the following steps:

S1: 1000 L of NMP waste slurry was taken for roughly crushing by using a double-shaft crusher with a blade distance of 50 mm at a rotation speed of 300 r/min, and then the NMP waste slurry was subjected to ball milling in a ball miller for 10 minutes in following conditions: a rotation speed of 1000 r/min, a ball-to-material ratio of 50:1, a grinding concentration of 80%, and a filling rate of 30%;

S2: a slurry after the ball milling was sieved through a 100-mesh sieve to remove foreign substances, and a pH value of the slurry was adjusted to about 8.0 with 0.5 mol/L dilute sulfuric acid; and S3: a pH-adjusted slurry was pumped into the centrifugal spray drying system, the system parameters was controlled as follows: a temperature of the hot air inlet was 200° C., a feeding speed was 800 L/h, a centrifugal speed was 25000 r/min, a temperature of the hot air outlet was 100° C.; the slurry was centrifuged at a high speed through the centrifugal nozzle; NMP and water in the slurry were quickly or instantaneously evaporated under the action of the hot air; a solid phase and a gas phase both entered the two swirl-flow separators for separation; and a powder material with relatively small density in the solid phase entered the bag filter and was absorbed by the bag filter; the gas phase was condensed by the condenser to obtain a NMP condensate which was temporarily stored in the condensate storage tank, and the condensate was purified by the rectification tower to obtain a pure NMP organic phase and a water phase; the obtained solid dried material was calcined at 1000° C. for 1 hour in an air atmosphere to remove the organic substances inside the material, so that a calcined material can be used as a raw material for a wet process.

Example 5

A centrifugal spray-drying system consists of a spray chamber 100, two swirl-flow separators 200, a bag filter 300, a condenser 400, a condensate storage tank 500, a rectification tower 600, a water phase collector 700, and an NMP collector 800. The spray chamber 100 is provided with a centrifugal nozzle 110 located at an upper part of the spray chamber 100, and provided with a hot air inlet 120 and a hot air outlet 130 respectively located at both sides of the spray chamber 100. The hot air outlet 130 is connected to an inlet of one swirl-flow separator 200. The swirl-flow separators 200, the bag filter 300, the condenser 400, the condensate storage tank 500, and the rectification tower 600 are connected in sequence.

A recovery method for a waste lithium battery slurry containing NMP, which comprises the following steps:

S1: 1000 L of NMP waste slurry was taken for roughly crushing by using a double-shaft crusher with a blade distance of 15 mm at a rotation speed of 500 r/min, and then the NMP waste slurry was subjected to ball milling in a ball miller for 30 minutes in following conditions: a rotation speed of 700 r/min, a ball-to-material ratio of 10:1, a grinding concentration of 75%, and a filling rate of 45%;

S2: a slurry after the ball milling was sieved through a 300-mesh sieve to remove foreign substances, and a pH value of the slurry was adjusted to about 7.0 with 0.3 mol/L dilute sulfuric acid; and S3: a pH-adjusted slurry was pumped into the centrifugal spray drying system, the system parameters was controlled as follows: a temperature of the hot air inlet was 300° C., a feeding speed was 1000 L/h, a centrifugal speed was 15000 r/min, a temperature of the hot air outlet was 150° C.; the slurry was centrifuged at a high speed through the centrifugal nozzle; NMP and water in the slurry were quickly or instantaneously evaporated under the action of the hot air; a solid phase and a gas phase both entered the two swirl-flow separators for separation, and a powder material with relatively small density in the solid phase entered the bag filter and was absorbed by the bag filter; the gas phase was condensed by the condenser to obtain a NMP condensate which was temporarily stored in the condensate storage tank, and the condensate was purified by the rectification tower to obtain a pure NMP organic phase and a water phase; the obtained solid dried material was calcined at 600° C. for 1.5 hour in an air atmosphere to remove the organic substances inside the material, so that a calcined material can be used as a raw material for a wet process.

Table 1 shows the solid content of the NMP waste slurry, the purity of the NMP condensate, the purity of the NMP organic phase after water removal, and the pH value and impurity content of the NMP organic phase in Examples 1 to 5.

TABLE 1

| Example | Solid content of waste slurry (%) | Purity of NMP condensate (%) | Purity of NMP organic phase (%) | pH | Co (mg/L) | Ni (mg/L) | Mn (mg/L) | Fe (mg/L) | Li (mg/L) |
|---|---|---|---|---|---|---|---|---|---|
| 1 | 60.97 | 85.2 | 98.1 | 7.0 | 0.11 | 0.13 | 0.20 | 0.27 | 0.75 |
| 2 | 55.48 | 81.5 | 96.0 | 7.1 | 0.27 | 0.12 | 0.30 | 0.33 | 0.15 |
| 3 | 58.52 | 82.0 | 96.3 | 7.5 | 0.17 | 0.15 | 0.25 | 0.10 | 0.05 |

TABLE 1-continued

| Example | Solid content of waste slurry (%) | Purity of NMP condensate (%) | Purity of NMP organic phase (%) | pH | Co (mg/L) | Ni (mg/L) | Mn (mg/L) | Fe (mg/L) | Li (mg/L) |
|---|---|---|---|---|---|---|---|---|---|
| 4 | 70.50 | 90.0 | 99.9 | 8.0 | 0.13 | 0.10 | 0.50 | 0.13 | 0.15 |
| 5 | 30.31 | 75.0 | 95.1 | 7.0 | 0.01 | 0.05 | 0.06 | 0.15 | 0.05 |

It can be seen from Table 1 that the solid content of the NMP waste slurry recovered according to the present invention can be more than 70%, and the obtained solid is powdery, indicating that a slurry with a relatively high solid content can be recovered according to the present invention. Moreover, it can be seen that the higher the solid content, the higher the purity of the NMP condensate. The purity can reach 90% with a relatively low impurity content, i.e. Ni+Co+Mn<1 ppm, indicating that the recovered NMP only needs to undergo simple distillation and purification treatment to obtain 99.9% or greater electronic grade NMP solvent. The NMP with relatively high purity can simplify the subsequent process of removing impurity, thereby reducing the recovery cost.

Figure 2:
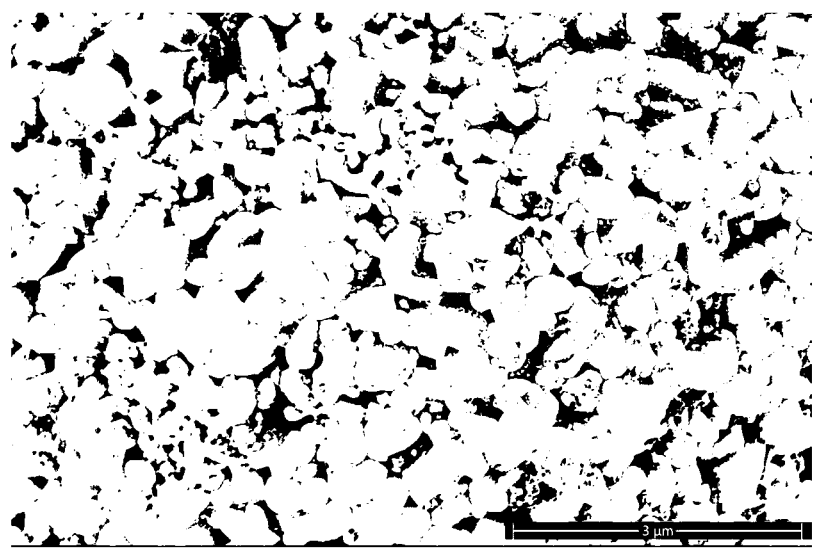
FIG. 2 is a scanning electron microscopic (SEM) morphology image of a dried solid material in Example 2 of the present invention.

FIG. 2 is the SEM morphology image of the dried solid material. It can be seen that the morphology of the solid material is spherical, and there are floccules on the surface of the solid material, which are mainly organic substances and carbon black that can be removed by calcination.

Figure 3:
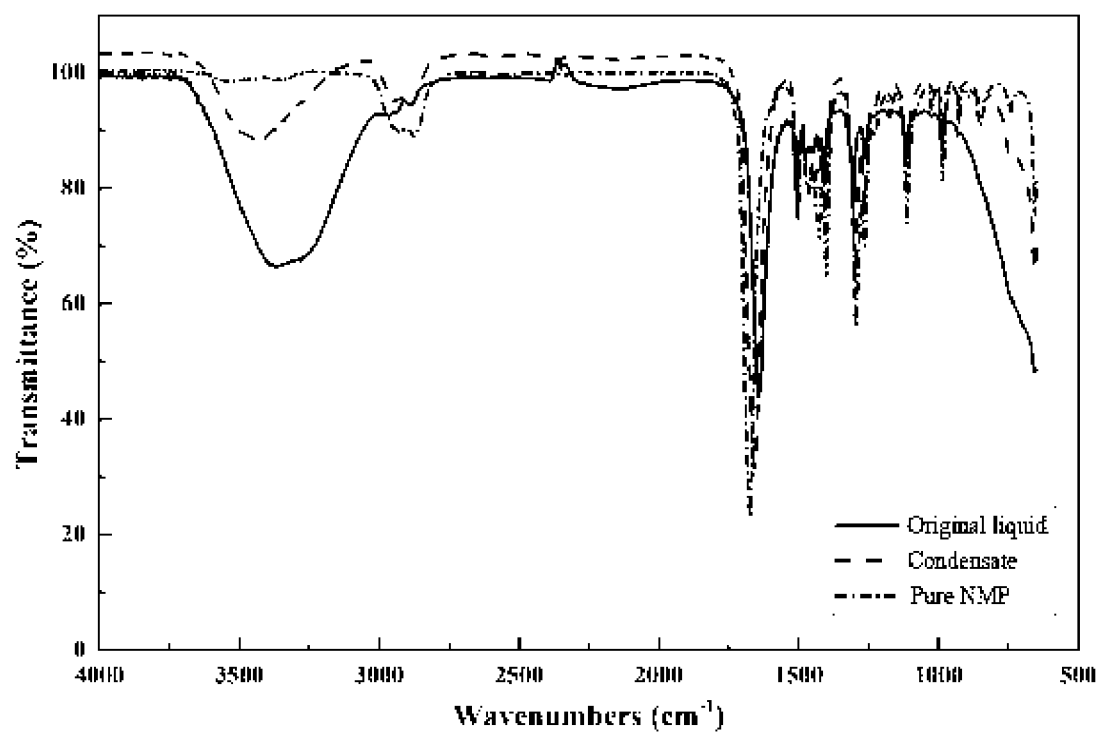
FIG. 3 is a Fourier transform infrared (FT-IR) diagram of a NMP condensate in Example 3 of the present invention.

FIG. 3 shows the infrared spectrum of the NMP condensate. It can be seen that the NMP condensate (corresponding to the "Condensate" legend in the figure) has characteristic absorption peaks similar to that of pure NMP. A relatively obvious absorption peak is the —OH absorption peak at about 3400 cm$^{-1}$, which corresponds to the characteristic peak of $H_2O$, indicating that the NMP condensate has a small amount of water, which can be removed by the rectification tower. The "Original liquid" in the figure represents untreated waste slurry.

The embodiments of the present invention are described in detail above in conjunction to the accompanying drawings. The present invention is not limited to the above-mentioned embodiments. Various changes can be made within the scope of knowledge possessed by a person of ordinary skill in the art without departing from the concept of the present invention. In addition, the embodiments in the present invention and the characteristics in the embodiments can be arbitrarily combined as long as there is no contradiction in the characteristics.

What is claimed is:

1. A recovery method for a lithium battery slurry, comprising:
    S1: roughly crushing a waste lithium battery slurry containing NMP, and then ball milling to obtain a ball milled slurry;
    S2: sieving the ball milled slurry, and adjusting a pH value of the slurry passed through the sieve; wherein the pH value is adjusted to a range of 7.0 to 8.0;
    S3: centrifugal spray-drying the pH-adjusted slurry to obtain a solid powder, and condensing and purifying the gas-phase NMP; wherein the centrifugal spray-drying is performed at a temperature of 150° C. to 300° C.

2. The recovery method according to claim 1, wherein the ball milling is performed in a ball-to-material ratio of (5-50):1 at a rotation speed from 300 r/min to 1000 r/min.

3. The recovery method according to claim 1, wherein the sieving is performed with a 100- to 300-mesh.

4. The recovery method according to claim 1, wherein a feeding rate is 800 L/h to 1500 L/h; and a centrifugal speed is 8000 r/min to 25000 r/min.

* * * * *